(12) United States Patent
Cao et al.

(10) Patent No.: US 11,290,022 B2
(45) Date of Patent: Mar. 29, 2022

(54) BIDIRECTIONAL ARCHITECTURES WITH PARTIAL ENERGY PROCESSING FOR DC/DC CONVERTERS

(71) Applicant: VIRGINIA TECH INTELLECTUAL PROPERTIES, INC., Blacksburg, VA (US)

(72) Inventors: Yuliang Cao, Blacksburg, VA (US); Minh Ngo, Blacksburg, VA (US); Ning Yan, Blacksburg, VA (US); Dong Dong, Blacksburg, VA (US); Rolando Burgos, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/008,893

(22) Filed: Sep. 1, 2020

(65) Prior Publication Data
US 2022/0069719 A1 Mar. 3, 2022

(51) Int. Cl.
*H02M 3/335* (2006.01)
*H02M 7/5387* (2007.01)
*H02M 1/00* (2006.01)

(52) U.S. Cl.
CPC ....... *H02M 3/33592* (2013.01); *H02M 1/007* (2021.05); *H02M 1/0077* (2021.05); *H02M 3/33584* (2013.01); *H02M 7/5387* (2013.01); *H02M 1/0003* (2021.05)

(58) Field of Classification Search
CPC ............... H02M 1/007; H02M 1/0077; H02M 3/335–337; H02M 7/5387; H02M 1/0003; H02M 3/33584; H02M 3/33592
See application file for complete search history.

(56) References Cited

U.S. PATENT DOCUMENTS

| 5,444,608 | A | * | 8/1995 | Jain | H02M 3/337 363/17 |
| 5,757,633 | A | * | 5/1998 | Bowles | H02M 7/49 363/41 |
| 6,058,032 | A | * | 5/2000 | Yamanaka | B60L 50/51 363/71 |

(Continued)

OTHER PUBLICATIONS

Tu et al.; Extreme Fast Charging of Electric Vehicles: A Technology Overview. IEEE Transactions on Transportation Electrification 5, No. 4 (2019): 861-78.

(Continued)

*Primary Examiner* — Yusef A Ahmed
(74) *Attorney, Agent, or Firm* — Thomas | Horstemeyer, LLP.; Jason M. Perilla (57) ABSTRACT

Aspects of bidirectional architectures with partial energy processing in resonant direct current (DC)-to-DC converters are described. In one embodiment, an alternating circuit (AC)-to-DC circuit generates an AC voltage from a DC voltage. A voltage of the AC voltage is transformed into a majority AC voltage of a majority power path and at least one minority AC voltage of the minority power paths. The majority AC voltage is rectified into a majority DC voltage and a minority AC voltage is rectified into a minority DC voltage. The majority power path and the minority power path are combined as a combined DC voltage.

18 Claims, 6 Drawing Sheets

(56) References Cited

U.S. PATENT DOCUMENTS

| | | | | |
|---|---|---|---|---|
| 8,736,102 | B1* | 5/2014 | Gao | H02M 7/48 |
| | | | | 307/17 |
| 9,614,453 | B2 | 4/2017 | Dai et al. | |
| 9,748,865 | B2* | 8/2017 | Ayai | H02M 7/5387 |
| 10,804,809 | B1* | 10/2020 | Yelaverthi | H02M 3/33561 |
| 2012/0092898 | A1* | 4/2012 | Raju | H02M 1/4258 |
| | | | | 363/17 |
| 2012/0275197 | A1* | 11/2012 | Yan | H02M 3/337 |
| | | | | 363/21.02 |
| 2013/0083563 | A1* | 4/2013 | Wang | H02M 3/285 |
| | | | | 363/17 |
| 2013/0249319 | A1* | 9/2013 | Cummings | H01L 31/02021 |
| | | | | 307/131 |
| 2013/0343089 | A1* | 12/2013 | Gupta | H02M 7/4807 |
| | | | | 363/16 |
| 2014/0097747 | A1* | 4/2014 | Bader | H01J 25/025 |
| | | | | 315/3 |
| 2015/0340947 | A1* | 11/2015 | Deboy | H02M 3/1582 |
| | | | | 307/82 |
| 2016/0072388 | A1* | 3/2016 | Dubus | H02M 3/3376 |
| | | | | 363/25 |
| 2016/0141964 | A1* | 5/2016 | Yu | H02M 3/33507 |
| | | | | 363/21.02 |
| 2016/0149501 | A1* | 5/2016 | Dai | H02M 3/337 |
| | | | | 363/21.02 |
| 2016/0197600 | A1* | 7/2016 | Kuznetsov | H02J 1/16 |
| | | | | 307/106 |
| 2016/0285387 | A1* | 9/2016 | Rodriguez | H02M 1/12 |
| 2017/0005584 | A1* | 1/2017 | Guepratte | H02M 3/33523 |
| 2017/0093299 | A1* | 3/2017 | Norimatsu | H02M 7/49 |
| 2017/0104422 | A1* | 4/2017 | Okumura | H02M 7/4807 |
| 2017/0133940 | A1* | 5/2017 | Wilkinson | H02M 3/337 |
| 2017/0310111 | A1* | 10/2017 | Badapanda | H02M 7/08 |
| 2018/0097361 | A1* | 4/2018 | Jakka | H02M 5/4585 |
| 2018/0175761 | A1* | 6/2018 | Jha | H02P 9/007 |
| 2019/0157980 | A1* | 5/2019 | Ji | H05B 6/685 |
| 2019/0238088 | A1* | 8/2019 | Zhuang | H02M 7/4807 |
| 2019/0326826 | A1* | 10/2019 | Otake | H02M 3/33592 |
| 2019/0355506 | A1* | 11/2019 | Fei | H02M 3/1584 |
| 2020/0006970 | A1* | 1/2020 | Chen | H02M 1/36 |
| 2020/0127581 | A1* | 4/2020 | Chen | H02M 3/33584 |
| 2020/0373785 | A1* | 11/2020 | Bagchi | H02J 50/12 |
| 2020/0375002 | A1* | 11/2020 | Das | H02M 3/337 |
| 2020/0412237 | A1* | 12/2020 | Dai | H02M 7/797 |

OTHER PUBLICATIONS

Neumayr et al.; (Jul. 2019) "P3DCT—Partial-Power Pre-Regulated DC Transformer." 6036 IEEE Transactions on Power Electronics, vol. 34, No. 7 (pp. 6036-6047).

* cited by examiner

BIDIRECTIONAL ARCHITECTURES WITH PARTIAL ENERGY PROCESSING FOR DC/DC CONVERTERS

GOVERNMENT LICENSE RIGHTS

This invention was made with government support under grant number 2014-0654-64 awarded by Power America. The government has certain rights in the invention.

BACKGROUND

Direct current (DC)-to-DC converters include electronic circuits and devices that convert a DC voltage from one level to another voltage level. While a voltage divider can be used to decrease a DC voltage to a lower level, the resulting voltage may not be steady once different resistive or reactive loads are applied. A DC-to-DC converter can help to maintain a voltage level once a load is applied. Unlike a voltage divider system, a DC-to-DC converter can also upconvert a lower DC voltage to a higher DC voltage.

DC-to-DC converters can be utilized for battery-powered devices such as handheld devices, computers, mobile phones, and other smaller battery-powered devices. These devices can involve relatively low voltages. As battery capacities and battery systems have developed, DC-to-DC converters have increasingly been utilized for higher voltage applications including electric vehicles, shipboard power, and higher voltage charging. However, existing DC-to-DC converters can be inefficient and can have a limited adjustment range for higher voltages.

For example, higher voltage applications can require larger devices to adjust and maintain the voltage or to withstand the high power or currents of these applications. As a result, there is a need for more efficient and effective DC-to-DC conversion architectures.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to direct current (DC)-to-DC converters. The described DC-to-DC converters include bidirectional architectures that can include partial energy processing. The described DC-to-DC converters can include resonant DC-to-DC converters. DC-to-DC converters can be utilized for battery-powered devices such as handheld devices, computers, mobile phones, and other battery-powered devices that involve relatively low voltages. Existing DC-to-DC converters can be inefficient and can have a limited adjustment range for higher voltages. As battery capacities and battery systems have developed, DC-to-DC converters are increasingly utilized for higher voltage applications including electric vehicles, shipboard power, and higher voltage charging. Existing DC-to-DC converters can be inefficient and can have a limited adjustment range for higher voltages. For example, higher voltage applications can require larger devices to adjust and maintain the voltage or to withstand the high power or currents of these applications.

However, the present disclosure involves architectures that can include partial energy processing to improve efficiency and output adjustment range compared with traditional DC-to-DC resonant converters. The architectures also involve simplified and efficient control schemes. For example, an individual power module's regulator can be switched separately and in some cases one at a time. The architectures further facilitate a low voltage modular design. Low $R_{dson}$ Gallium Nitride (GaN) devices can be used in each module to achieve high efficiency and high power density. High operation frequency and magnetic integration can shrink the volume of the transformer, which can also increase power density. Rotation control can be adopted to improve the thermal performance and stability of the system.

Some aspects involve an alternating current (AC) signal being generated from a DC voltage. This can be achieved using a DC-to-AC circuit such as a full-bridge circuit. A transformer, or multiple transformers, can be used to transform the AC voltage into a majority AC voltage of a majority power path and a minority AC voltage of a minority power path. Multiple minority AC voltages can be transformed from the AC voltage. The majority AC voltage can be rectified into a majority DC voltage and the minority AC voltage can be rectified into a minority DC voltage. In some cases, a regulator circuit in the minority power path can be used to adjust a combined DC voltage of the majority power path and the minority power path.

The partial energy processing provided by the separate majority power path and minority power paths for the DC-to-DC converter system can allow for more efficient power transfer because the majority power path can be unregulated. In other words, the majority power path can be designed and constructed to omit a potentially lossy regulator. Regulators for higher power applications can result in inefficiency. However, the partial energy processing techniques can nevertheless allow for a wide range of voltage regulation by minority power path voltage adjustment techniques such as smaller minority path regulators, switching activation statuses of minority power modules, and other voltage adjustments, such as phase shift techniques.

Activation statuses of minority power modules in the minority power path can be rotated while maintaining the combined DC voltage at a predetermined voltage. In some cases, a multiple-winding transformer can be used to generate the majority AC voltage and the minority AC voltage from the AC voltage. A transformer of the majority power path can be separate from a multiple-winding transformer of the minority power path. A transformer of the majority power path can be separate from multiple transformers used in the minority power path.

Figure 1:
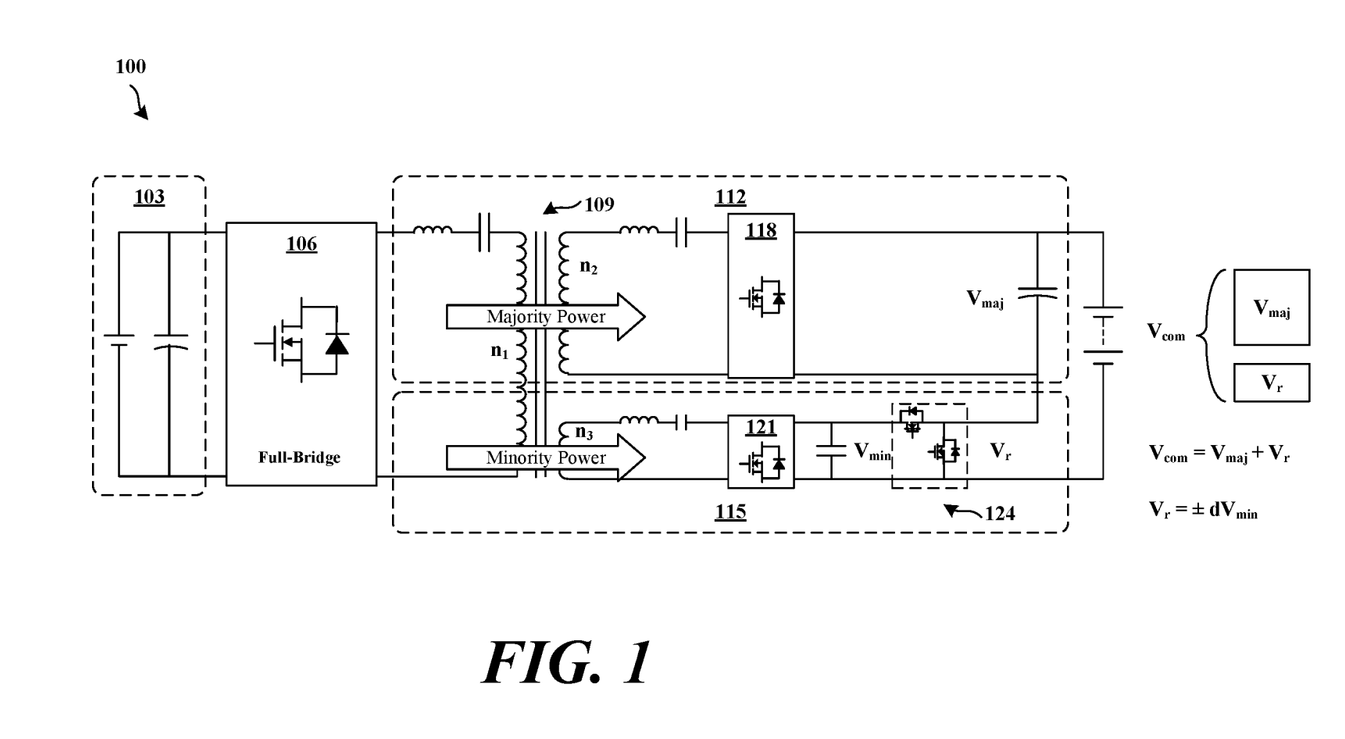
FIG. 1 illustrates an example of a bidirectional DC-to-DC converter architecture with a majority power path and a minority power path, according to embodiments of the present disclosure.

Turning now to the drawings, FIG. 1 illustrates a DC-to-DC converter system 100 including a DC power grid or DC source 103, a DC-to-AC circuit 106, a majority power path 112, a minority power path 115, and a combined DC output, $V_{com}$.

The DC source 103 can generate a DC voltage with a particular magnitude or value. The DC source 103 or another component of the DC-to-DC converter system 100 can also include a capacitor or another voltage smoothing component, as well as other passive and active circuit components. The DC source 103 can provide the DC voltage as an input to the DC-to-AC circuit 106.

The DC-to-AC circuit 106 can include one or more of a full-bridge circuit, an inverter circuit, and other circuits. While a full-bridge circuit can be utilized, a half-bridge version can also be utilized. The DC-to-AC circuit 106 can take the DC voltage as an input and can output an AC voltage. The DC-to-AC circuit 106 can generate the AC voltage as a square wave, a sine wave, or a modified sine wave at a particular frequency. In some cases, the square wave, a sine wave, or a modified sine wave can be a result of the topology or configuration utilized. For example, a CLLC or another resonant converter topology or configuration can result in a sine wave while another topology can result in a square wave AC voltage. A CLLC topology can include an inverter and a capacitor at each input and each output from the transformation component 109. The AC voltage can have its maximum and minimum values evenly centered at zero volts, or can be shifted in magnitude. In some examples, the AC voltage can include all positive (or negative) voltages with a minimum (or maximum) of zero volts.

The DC-to-DC converter system 100 can include a transformer or transformation component 109 that facilitates or provides for the majority power path 112 and the minority power path 115. As will be discussed in further detail with respect to FIGS. 4A-4C, the transformation component 109 can include a single transformer with multiple windings, or multiple transformers in various arrangements and topologies.

In the example shown on FIG. 1, the transformation component 109 can include a multiple-winding transformer that has a primary winding with "$n_1$" turns. The transformation component 109 can also include a transformer secondary with multiple secondary windings. The secondary outputs can include a majority power output or winding with "$n_2$" turns, and a minority power output with "$n_3$" turns. In this example, $n_2$ can be greater than $n_3$. The transformation component 109 can convert the AC voltage into a majority AC voltage for the majority power path 112, and a minority AC voltage for the minority power path 115. Since $n_2$ can be greater than $n_3$, the majority AC voltage can be greater than the minority AC voltage.

The DC-to-DC converter system 100 can include passive circuit components such as inductors and capacitors on both the primary and secondary sides of the transformation component 109. For example, a resonant tank can be used for each input and each output of the transformer or transformation component 109 for a CLLC topology and control scheme, or other resonant converter configurations and control schemes having various resonant tank circuits. A resonant tank circuit can include one or more inductor, capacitor, and other circuit components in various configurations. Some resonant converter configurations can use specific current and/or voltage waveforms. Some of the topologies discussed herein involve sine wave currents that have greater efficiency passing through these resonant components than other topologies, of which the currents can be triangle, square, or trapezoidal. Each resonant tank circuit can have the same predetermined resonant frequency.

As will be discussed further with respect to FIGS. 4A-4F, various DC-to-DC converter systems can include Dual Active Bridge (DAB) converter topology and a control scheme for the minority power path 115 and also in some cases for the majority power path 112. DAB converters and converter power paths do not require a resonant tank circuit, and can utilize an inductor for each input and each output of a transformer or transformation component 109. In addition, DAB power paths can utilize single phase shift (SPS), extended phase shift (EPS), dual phase shift (DPS), and other phase shift techniques to control voltage outputs including $V_{min}$ and $V_{maj}$ without the use of a regulator circuit 124.

The majority power path 112 can include an AC-to-DC circuit, which can be referred to as a majority AC-to-DC circuit 118 or majority rectifier. The majority AC-to-DC circuit 118 can take the majority AC voltage as an input, and can output a majority DC voltage, $V_{maj}$. In some cases, the majority DC voltage can be output across a capacitor or a DC smoothing circuit. This can also be referred to as a base DC voltage. The minority power path 115 can include an AC-to-DC circuit, which can be referred to as a minority AC-to-DC circuit 121 or minority rectifier. The minority AC-to-DC circuit 121 can take the minority AC voltage as an input, and can output a minority DC voltage, $V_{min}$. In some cases, the minority DC voltage can be output across a capacitor or a DC smoothing circuit. The AC-to-DC circuits 118 and 121 can include full-bridge AC-to-DC circuits, half bridge AC-to-DC circuits, and other types of AC-to-DC circuits.

The minority power path 115 can include a minority power module. The example shown includes one minority power module, but multiple minority power modules can be used. The minority power module can include the resonant tank circuit, the minority AC-to-DC circuit, and the capacitor or DC smoothing circuit. In the example shown, the minority power path 115 can also include a regulator circuit 124. The regulator circuit 124 can be used in the minority power path 115, and specifically in a minority power module. As a result, the regulator circuit 124 can be referred to as a minority regulator or a minority power module regulator.

When there are multiple minority power modules, various architectures can be used. For example, a regulator circuit 124 can be utilized in each minority power module. In some situations where multiple regulator circuits 124 are used for multiple minority power modules, only a single regulator circuit 124 of a single minority power module is used to adjust or regulate voltage. The additional regulator circuits 124 can be used for switching an activation status of the minority power modules. While each regulator circuit 124 can have a duty cycle, some control schemes can utilize a non-unity duty cycle for a single regulator circuit 124 at a time. The regulator circuit 124 that is utilized for a non-unity duty cycle or modified unity can also be rotated to prevent maintenance issues from overuse of duty cycle switching for a single regulator circuit 124. These configurations will be discussed further with respect to FIG. 2.

An output of the DC-to-DC converter can be a combined DC voltage, $V_{com}$. The combined DC voltage can be a combination of the majority DC voltage and the minority DC voltage. In the example shown, the combined DC voltage can include a sum of the majority DC voltage and a regulated DC voltage $V_r$. The regulated DC voltage can be a product of the minority DC voltage and a duty cycle, d. The duty cycle can be expressed as a percentage, fraction, decimal, or value from 0 to 1. The value determines or represents a percentage of time the regulator is in an on state. A duty cycle of 1 can be referred to as unity. The regulator duty can be utilized to adjust the minority DC voltage output from the minority power module. The polarity of the regulated DC voltage can also be determined by the regulator or a regulator switching circuit.

Figure 2:
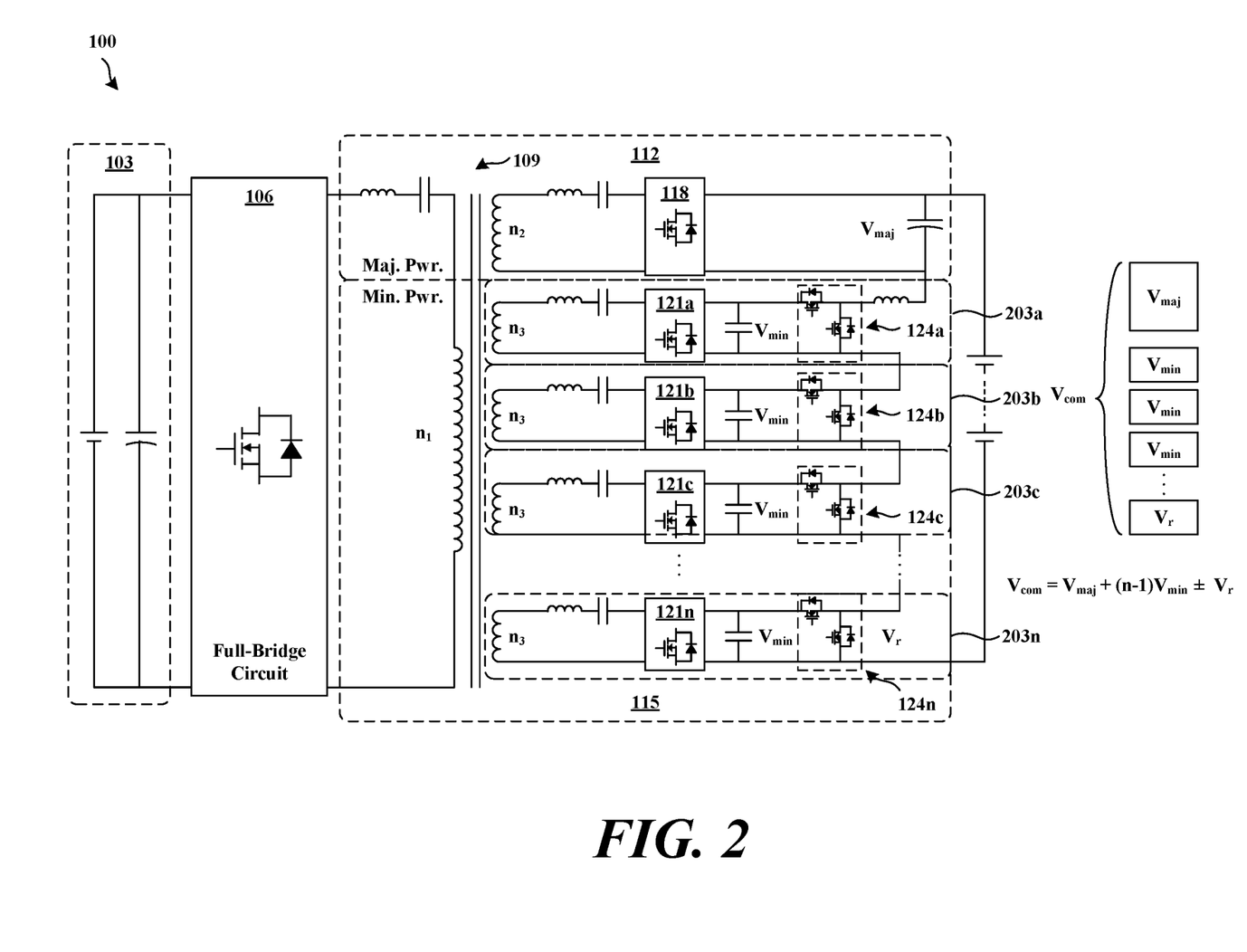
FIG. 2 illustrates another example of a bidirectional DC-to-DC converter architecture with a majority power path and a minority power path that includes a regulator circuit for each minority power module, according to embodiments of the present disclosure.

FIG. 2 illustrates another example of a DC-to-DC converter system 100, which includes a DC source 103, a DC-to-AC circuit 106, a majority power path 112, a minority power path 115, and a combined DC output, $V_{com}$. The DC-to-DC converter system 100 of FIG. 2 includes a set of minority power outputs, and a corresponding set of minority power modules 203a-n. The minority power modules 203a-n can include respective minority power outputs, passive circuit components such as a resonant tank or another LC or RLC circuit, minority AC-to-DC circuits 121a-n, and regulators 124a-n. In this case, a resonant tank circuit is included, and the DC-to-DC converter system 100 can be a CLLC or other resonant DC-to-DC converter system.

The DC source 103 can generate a DC voltage with a particular magnitude or value. The DC source 103 or another component of the DC-to-DC converter system 100 can also include a capacitor or another voltage smoothing component, as well as other passive and active circuit components. The DC source 103 can provide the DC voltage as an input to the DC-to-AC circuit 106.

The DC-to-AC circuit 106 can take the DC voltage as an input and can output an AC voltage. The DC-to-AC circuit 106 can generate the AC voltage as a square wave, a sine wave, or a modified sine wave at a particular frequency. In some cases the square wave, a sine wave, or a modified sine wave can be a result of the topology or configuration utilized. For example, a CLLC can result in a square wave AC voltage and a sine wave current.

The DC-to-DC converter system 100 can include a transformer or transformation component 109 that facilitates or provides for the majority power path 112 and the minority power path 115. For example, a single transformer with multiple windings, or multiple different transformers can be used. Some arrangements can include multiple tap transformer windings. In the example shown, the transformation component 109 can include a multiple-winding transformer that has a primary winding with "$n_1$" turns. The transformation component 109 can also include a secondary with multiple secondary windings.

Secondary outputs can include a majority power output or winding with "$n_2$" turns. The secondary outputs can also include and a set of minority power outputs, each with "$n_3$" turns. In the example shown, a single transformer core can be used for all of the secondary windings. However, in other arrangements, the majority power path 112 can use a separate transformer from the minority power path 115. Further, while the set of minority power outputs can be on a single transformer, each minority power output of the set can utilize a separate transformer as well.

The transformation component 109 can convert the AC voltage into a majority AC voltage for the majority power path 112, and multiple minority AC voltage outputs for the minority power path 115. Since $n_2$ can be greater than $n_3$, the majority AC voltage can be greater than the minority AC voltage. In other words, the voltage level output through the majority power path 112, in AC and rectified as DC, can be greater than the individual minority power outputs. In further examples, the voltage level output through the majority power path 112 can be greater than a sum of the minority power outputs.

The majority power path 112 can include an AC-to-DC circuit, which can be referred to as a majority AC-to-DC circuit 118 or majority rectifier. The majority AC-to-DC circuit 118 can take the majority AC voltage as an input, and can output a majority DC voltage, $V_{maj}$. In some cases, the majority DC voltage can be output across a capacitor or a DC smoothing circuit. This can also be referred to as a base DC voltage. The majority power path 112 can include the majority power output, passive circuit components such as a resonant tank or another LC or RLC circuit, the majority AC-to-DC circuit 118, and the capacitor or DC smoothing circuit.

As indicated above, the DC-to-DC converter system 100 can include a set of minority power outputs, and a corresponding set of minority power modules 203a-n. The minority power modules 203a-n can include respective minority power outputs, passive circuit components such as a resonant tank or another LC or RLC circuit, minority AC-to-DC circuits 121a-n, and regulators 124a-n.

This arrangement allows for regulator-based switching of an activation status for each of the minority power modules 203a-n, as well as regulation or a duty cycle for each of the minority power modules 203a-n. An "on" or "activated" status can indicate that the voltage $V_{min}$ across for a particular one of the minority power modules 203a-n is on or added into a minority DC voltage. An "off" or "deactivated" status can indicate that the voltage $V_{min}$ across for a particular one of the minority power modules 203a-n is off, or not added into the total minority DC voltage.

This arrangement of regulators 124a-n for each of the minority power modules 203a-n also allows for rotation of which one of the regulators 124a-n is utilized with a non-unity duty cycle. For example, the DC-to-DC converter system 100 can maintain the combined DC voltage to a predetermined or threshold voltage level. In some cases, a single one of the regulators 124a-n is utilized with a non-unity duty cycle in order to maintain the combined DC voltage while the rest of the regulators 124a-n are using a unity duty cycle. As a result, n−1 of the regulators 124a-n provide $dV_{min}=1V_{min}$, while one of the regulators 124a-n provides $\pm dV_{min}$, where d is a non-unity value. However, since each of the regulators 124a-n is capable of this duty cycle voltage adjustment, a control scheme can rotate which one of the regulators 124a-n provides a non-unity duty cycle. The rotation can be based on a threshold period of time between rotations, a sensor value such as a temperature reading associated with one of the regulators 124a-n, and other bases.

In some cases, the number of activated or deactivated minority power modules 203a-n can be changed in order to maintain or change the combined DC voltage being provided. For example, a control device for the DC-to-DC converter system 100 can determine that a difference between actual DC voltage and a desired DC voltage is unable to be met by controlling a polarity and duty cycle of a single regulator 124. The control device can then maintain or change the combined DC voltage to the desired DC voltage by regulator-based minority power module switching. For example, one or more of the regulators 124 can change an activation status of corresponding minority power modules 203. The combined voltage $V_{com}$ can be expressed as $V_{com}=V_{maj}+(n-1)V_{min}\pm V_r$. If one or more of the minority power modules 203 are deactivated, n can represent a total number of activated minority power modules 203 rather than a total number of minority power modules 203 that are included in the DC-to-DC converter system 100.

Figure 3:
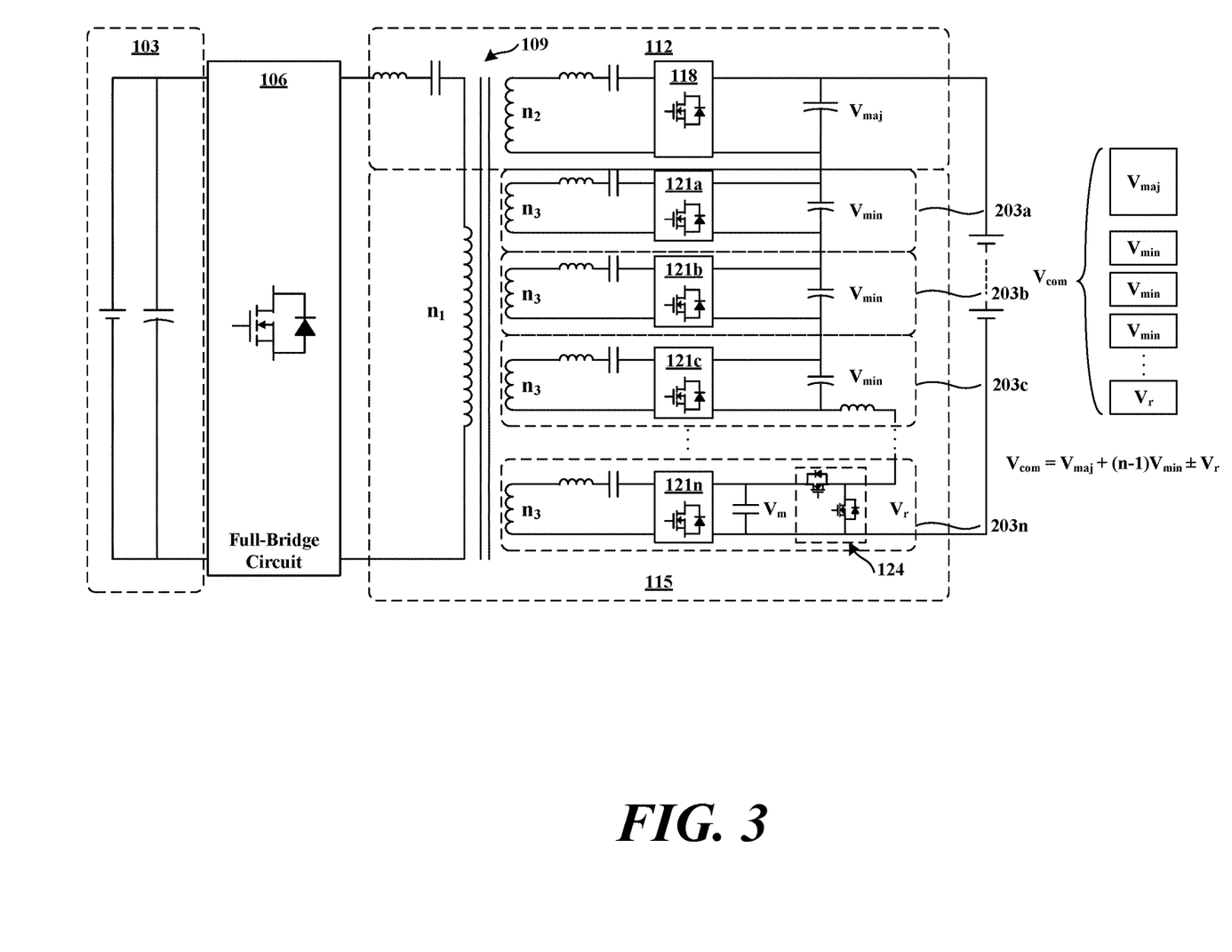
FIG. 3 illustrates another example of a bidirectional DC-to-DC converter architecture with a majority power path and a minority power path that includes a regulator circuit for a single minority power module, according to embodiments of the present disclosure.

FIG. 3 illustrates another example of a DC-to-DC converter system 100, which includes a DC source 103, a DC-to-AC circuit 106, a majority power path 112, a minority power path 115, and a combined DC output, $V_{com}$. The DC-to-DC converter system 100 of FIG. 3 includes a set of minority power outputs and corresponding minority power modules 203a-n. However, only a single minority power module 203n includes a regulator 124. The majority power path 112 can include a portion of the transformer component 109, a majority AC-to-DC circuit 118, and other components.

The minority power modules 203a-n can include respective minority power outputs, passive circuit components such as a resonant tank or another LC or RLC circuit, minority AC-to-DC circuits 121a-n, and regulators 124a-n. In this case, a resonant tank circuit is included, and the DC-to-DC converter system 100 can be a CLLC or other resonant DC-to-DC converter system.

This arrangement includes a single regulator 124 that can be used for regulator duty-cycle adjustments. However, in some examples, a control device can cause the DC-to-DC converter system 100 to effect switching of an activation status for each of the minority power modules 203a-n using the minority AC-to-DC circuits 121a-n, which can include full-bridge or half-bridge circuits capable of switching. As a result, the number of activated or deactivated minority power modules 203a-n can be changed in order to maintain or change the combined DC voltage being provided. For example, a control device for the DC-to-DC converter system 100 can determine that a difference between actual DC voltage and a desired DC voltage is unable to be met by controlling a polarity and duty cycle of a single regulator 124. The control device can then maintain or change the combined DC voltage to the desired DC voltage by full-bridge-based or AC-to-DC-circuit-based minority power module switching. For example, one or more of the minority AC-to-DC circuits 121a-n can change activation statuses for corresponding minority power modules 203. The combined voltage $V_{com}$ can be expressed as $V_{com}=V_{maj}+(n-1)V_{min}\pm V_r$. If one or more of the minority power modules 203 are deactivated, n can represent a total number of activated minority power modules 203 rather than a total number of minority power modules 203 that are included in the DC-to-DC converter system 100.

Figure 4A:
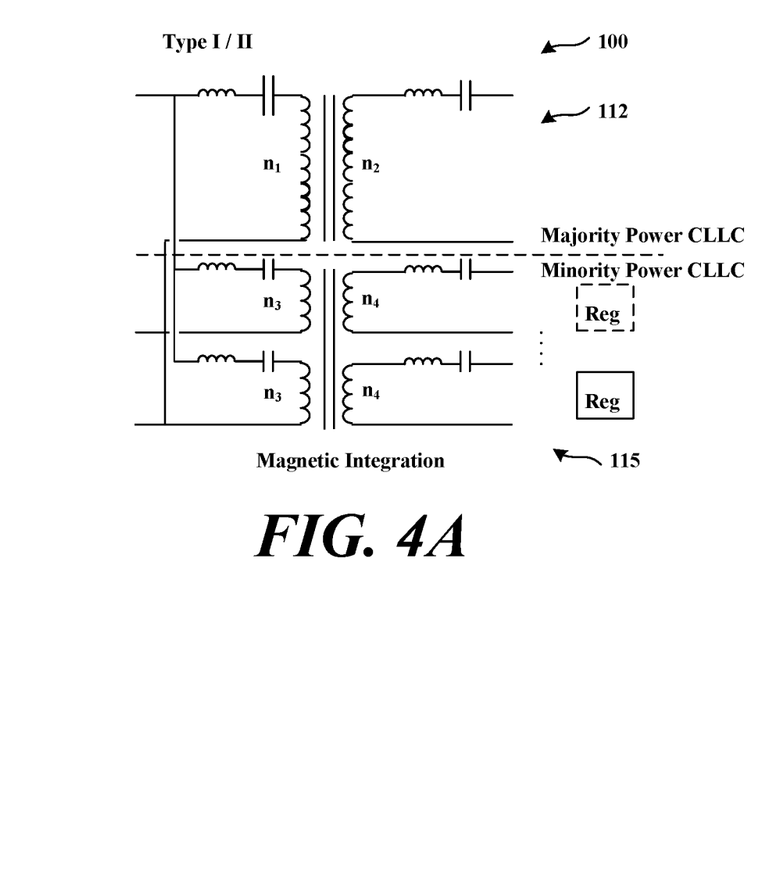
FIGS. 4A-4F illustrate examples of configurations for various bidirectional DC-to-DC converters, according to embodiments of the present disclosure.

FIG. 4A shows an example DC-to-DC converter system 100 that includes a resonant DC-to-DC topology for both a majority power path 112 and a minority power path 115. The resonant DC-to-DC topology is shown as CLLC, but another resonant DC-to-DC topology can be used. By contrast with the configurations of FIGS. 1-3, the majority power path 112 and minority power path 115 are not magnetically integrated. In other words, separate transformers and separate cores are utilized for the majority power path 112 and the minority power path 115. However, this topology nevertheless has magnetically integrated transformer configuration that integrates all of the minority power modules of the minority power path 115. In other words, a single transformer with multiple windings can be used for the all of the minority power modules of the minority power path 115.

The resonant DC-to-DC topology for both majority power path 112 and minority power path 115 can form the basis of different types of DC-to-DC converter systems 100, based on their regulator configurations. For example, a "Type I" DC-to-DC converter can include a respective regulator for each minority power module of the minority power path 115. While the magnetic integration of FIG. 1 further integrates the majority power path 112 with the minority power path 115, it can also be considered a "Type I" DC-to-DC converter. A "Type II" DC-to-DC converter can include a single regulator, regardless of a number of minority power modules 203. While the magnetic integration of FIG. 2 further integrates the majority power path 112 with the minority power path 115, it can also be considered a "Type II" DC-to-DC converter.

Figure 4B:
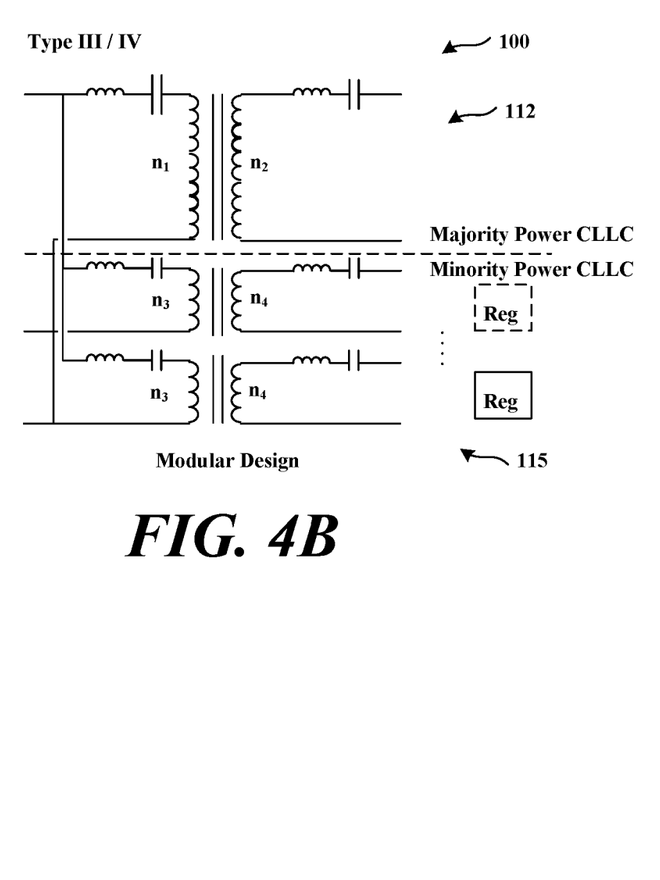

FIG. 4B shows another example DC-to-DC converter system 100 that includes a resonant DC-to-DC converter topology for both a majority power path 112 and a minority power path 115. The resonant DC-to-DC topology is shown as CLLC, but another resonant DC-to-DC topology can be used. By contrast with the configuration of FIG. 2, the minority power modules of the minority power path 115 are not magnetically integrated, and instead use a modular transformer configuration. In other words, separate transformers and separate cores are utilized for each minority power module of the minority power path 115.

The resonant DC-to-DC topology for both majority power path 112 and minority power path 115 can form the basis of different types of DC-to-DC converter systems 100. For example, a "Type III" DC-to-DC converter can include a respective regulator for each minority power module of the minority power path 115. However, a "Type IV" DC-to-DC converter can include a single regulator, regardless of a number of minority power modules.

While Type III and Type IV converters are potentially not as compact as Types I and II, the Type III and Type IV converters can utilize modular and easily expandable design. Since the minority power modules can each utilize separate transformers, a single minority power module can be designed and replicated such that each of the minority power modules uses the same design. By contrast, while the magnetic integrated Type I and Type II converters can require more careful or unique design for each of the minority power modules, the magnetic integrated DC-to-DC converters can have increased power density.

Figure 4C:
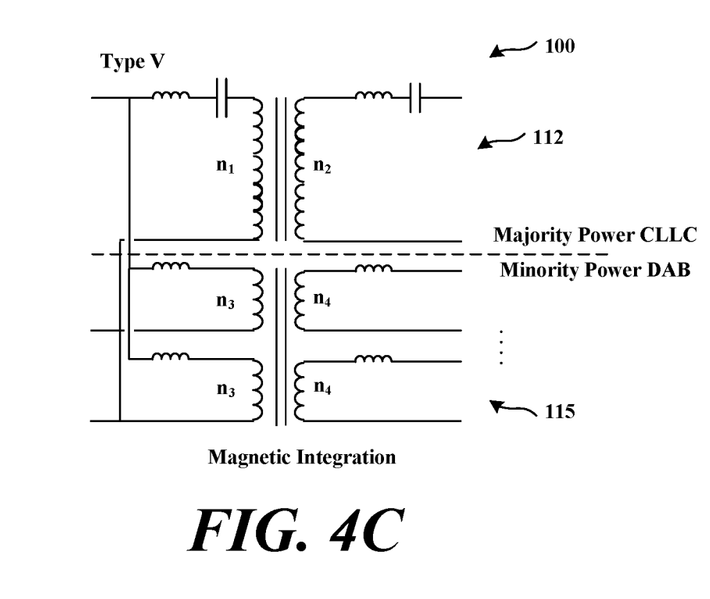

FIG. 4C shows another example DC-to-DC converter system 100 that includes a resonant DC-to-DC topology for a majority power path 112. A minority power path 115 includes a magnetically integrated transformer configuration and a DAB converter configuration. This can be referred to as a "Type V" DC-to-DC converter configuration. The resonant DC-to-DC topology of the majority power path is shown as CLLC, but another resonant DC-to-DC topology can be used. The minority power path 115 includes a magnetically integrated DAB topology of magnetically integrated minority power modules. While the majority power path 112 and minority power path 115 are not shown as magnetically integrated, a variant of this DC-to-DC converter system 100 can further magnetically integrate both power paths. Adjustment of the combined DC voltage of the DC-to-DC converter system 100 can be performed using the minority power path 115, which has a DAB DC-to-DC converter topology. The DAB topology can utilize phase shift techniques such as SPS, EPS, and DPS to adjust the voltage of one or more of the minority power modules of the minority power path 115. As a result, the Type V DC-to-DC converter does not utilize regulators to maintain or adjust voltage to a desired level.

Figure 4D:
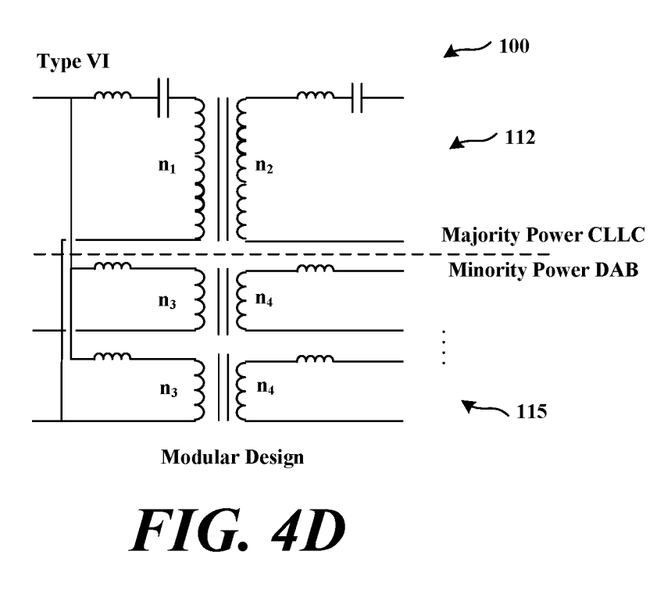

FIG. 4D shows another example DC-to-DC converter system 100 that includes a resonant DC-to-DC topology for a majority power path 112 and a modular DAB topology for a minority power path 115. This can be referred to as a "Type VI" DC-to-DC converter. The resonant DC-to-DC topology of the majority power path is shown as CLLC, but another resonant DC-to-DC topology can be used. The minority power path 115 includes a modular and expandable DAB topology with a separate transformer for each minority power module. Adjustment of the combined DC voltage of the DC-to-DC converter system 100 can be performed using the minority power path 115, which has a DAB DC-to-DC converter topology for each minority path module. The DAB topology can utilize phase shift techniques such as SPS, EPS, and DPS to adjust voltage of one or more of the minority power modules of the minority power path 115. As a result, the Type VI DC-to-DC converter does not utilize regulators to maintain or adjust voltage to a desired level.

While Type VI converters are potentially not as compact as Type V converters, the Type VI converters can utilize modular and easily expandable design. Since the minority power modules can each utilize separate transformers, a single minority power module can be designed and replicated such that each of the minority power modules uses the same design. By contrast, while the magnetic integrated Type V converters can require more careful or unique design for each of the minority power modules, the magnetic integrated DC-to-DC converters can have increased power density.

Figure 4E:
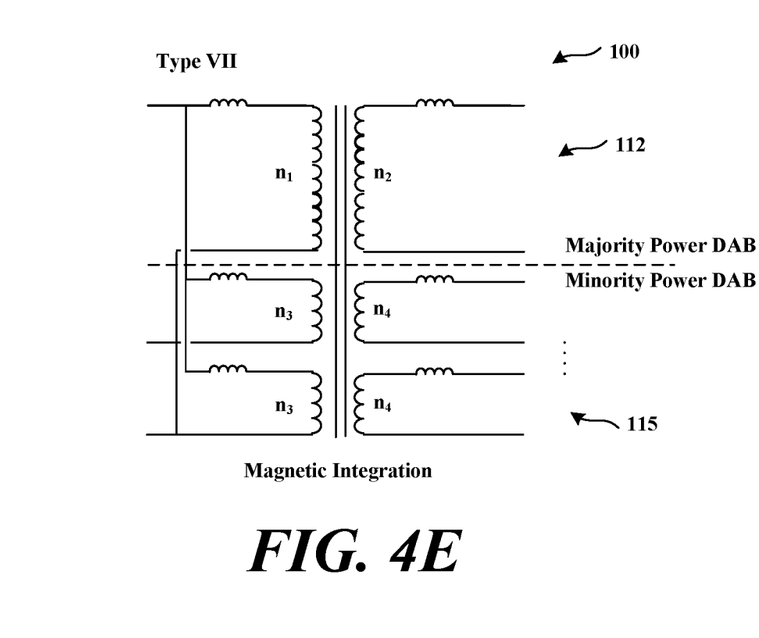

FIG. 4E shows another example DC-to-DC converter system 100 that includes a DAB topology for a majority power path 112 and a magnetically integrated DAB topology for a minority power path 115. This can be referred to as a "Type VII" DC-to-DC converter. The minority power path 115 includes a magnetically integrated DAB topology of magnetically integrated minority power modules. While the majority power path 112 and minority power path 115 are shown as magnetically integrated, a variant of this DC-to-DC converter system 100 can separate the power paths into different transformers and cores. Adjustment of the combined DC voltage of the DC-to-DC converter system 100 can be performed using the minority power path 115, which has a DAB DC-to-DC converter topology. The DAB topology can utilize phase shift techniques such as SPS, EPS, and DPS to adjust voltage of one or more of the minority power modules of the minority power path 115. As a result, the Type VII DC-to-DC converter does not utilize regulators to maintain or adjust voltage to a desired level.

Figure 4F:
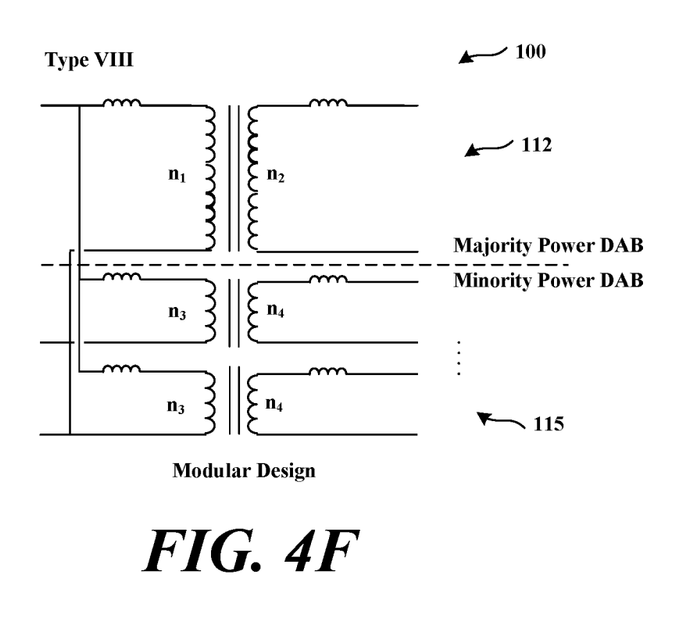

FIG. 4F shows another example DC-to-DC converter system 100 that includes a DAB topology for a majority power path 112 and a modular DAB topology for a minority power path 115. This can be referred to as a "Type VIII" DC-to-DC converter. The minority power path 115 includes a modular and expandable DAB topology with a separate transformer for each minority power module. Adjustment of the combined DC voltage of the DC-to-DC converter system 100 can be performed using the minority power path 115, which has a DAB DC-to-DC converter topology for each minority path module. The DAB topology can utilize phase shift techniques such as SPS, EPS, and DPS to adjust voltage of one or more of the minority power modules of the minority power path 115. As a result, the Type VIII DC-to-DC converter does not utilize regulators to maintain or adjust voltage to a desired level.

While Type VIII converters are potentially not as compact as Type VII converters, the Type VIII converters can utilize modular and easily expandable design. Since the minority power modules can each utilize separate transformers, a single minority power module can be designed and replicated such that each of the minority power modules uses the same design. By contrast, while the magnetic integrated Type VII converters can require more careful or unique design for each of the minority power modules, the magnetic integrated DC-to-DC converters can have increased power density.

The components and devices described herein, to the extent applicable, can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. While figures are provided for clarity of discussion, it is understood that the concepts described with respect to a particular figure can be utilized and combined with the concepts described with respect to the other figures. Many variations and modifications can be made without departing substantially from the spirit and principles of the disclosure. All such modifications and variations are intended to be included herein within the scope of this disclosure and protected by the following claims.

Therefore, the following is claimed:

1. A system, comprising:
   a direct circuit (DC)-to-alternating current (AC) circuit that generates an AC voltage based at least in part on a DC voltage;
   at least one transformer that transforms the AC voltage into: a majority AC voltage for a majority power path, and a plurality of minority AC voltages for a minority power path;
   a majority AC-to-DC circuit that rectifies the majority AC voltage into a majority DC voltage;
   a plurality of minority AC-to-DC circuits that rectify the plurality of minority AC voltages into at least one minority DC voltage;
   a plurality of regulator circuits of the minority power path, wherein the plurality of regulator circuits regulate the at least one minority DC voltage to adjust a combined DC voltage of the majority power path and the minority power path; and
   a controller configured to:
   rotate a use of a non-unity duty cycle among the plurality of regulator circuits; and adjust the non-unity duty cycle to regulate the combined DC voltage of the system to a predetermined voltage based at least in part on the majority DC voltage and the at least one minority DC voltage.

2. The system of claim 1, wherein the minority power path comprises a plurality of minority power modules, and the plurality of the minority power modules comprise the plurality of regulator circuits.

3. The system of claim 1, wherein the minority power path comprises a plurality of minority power modules.

4. The system of claim 1, wherein one of the majority power path and the minority power path comprises a CLLC converter configuration.

5. The system of claim 1, wherein the majority power path comprises a CLLC converter configuration and the minority power path comprises a Dual Active Bridge (DAB) converter configuration.

6. The system of claim 1, wherein the at least one transformer comprises a multiple-winding transformer.

7. The system of claim 1, wherein the at least one transformer comprises a transformer of the majority power path and a multiple-winding transformer of the minority power path, wherein the multiple-winding transformer is separate from the transformer of the majority power path.

8. The system of claim 1, wherein the at least one transformer comprises a transformer of the majority power path and a plurality of transformers of the minority power path, wherein the plurality of transformers are separate from the transformer of the majority power path.

9. The system of claim 1, wherein the minority power path comprises a magnetically integrated transformer configuration.

10. A direct current (DC)-to-DC converter, comprising:
a full-bridge circuit that converts a DC voltage into an AC voltage;
a majority power path comprising a majority transformer component and a majority AC-to-DC circuit, the majority power path generating a majority DC voltage based at least in part on the AC voltage;
a minority power path comprising at least one minority transformer component, a plurality of minority AC-to-DC circuits, and a plurality of regulator circuits, the minority power path generating at least one minority DC voltage based at least in part on the AC voltage; and
a controller configured to:
rotate a use of a non-unity duty cycle among the plurality of regulator circuits; and
adjust the non-unity duty cycle to regulate a combined DC voltage of the DC-to-DC converter to a predetermined voltage based at least in part on the majority DC voltage and the at least one minority DC voltage.

11. The DC-to-DC converter of claim 10, wherein the combined DC voltage is maintained by adjusting the minority power path.

12. The DC-to-DC converter of claim 10, wherein a respective one of the majority power path and the minority power path comprises a resonant converter configuration.

13. The DC-to-DC converter of claim 10, wherein the majority power path comprises a resonant converter configuration and the minority power path comprises a Dual Active Bridge (DAB) converter configuration.

14. The DC-to-DC converter of claim 10, wherein the minority power path comprises a magnetically integrated transformer configuration.

15. The DC-to-DC converter of claim 10, wherein the minority power path comprises a modular transformer configuration.

16. A method, comprising:
generating, by a direct circuit (DC)-to-alternating current (AC) circuit, an AC voltage based at least in part on a DC voltage;
transforming, by at least one transformer, a voltage of the AC voltage into a majority AC voltage for a majority power path and at least one minority AC voltage for a minority power path;
rectifying, by a majority AC-to-DC circuit, the majority AC voltage into a majority DC voltage;
rectifying, by at least one minority AC-to-DC circuit, the at least one minority AC voltage into at least one minority DC voltage;
rotating, by a controller, a use of a non-unity duty cycle among a plurality of regulator circuits of the minority power path; and
adjusting, by the controller, the non-unity duty cycle to regulate a combined DC voltage of the majority power path and the minority power path to a predetermined voltage based at least in part on the majority DC voltage and the at least one minority DC voltage.

17. The method of claim 16, wherein the minority power path comprises a Dual Active Bridge (DAB) configuration, and the at least one minority DC voltage is adjusted based on a phase shift technique.

18. The method of claim 16, wherein the at least one transformer comprises a multiple-winding transformer.

* * * * *